United States Patent [19]

Stark

[11] 4,124,928

[45] Nov. 14, 1978

[54] PROPELLER SHAFT LINER AND INSERTING APPARATUS

[76] Inventor: Martin H. Stark, 109 N. Wheeler, Saginaw, Mich. 48602

[21] Appl. No.: 763,170

[22] Filed: Jan. 27, 1977

Related U.S. Application Data

[62] Division of Ser. No. 544,236, Jan. 27, 1975, Pat. No. 4,014,184.

[51] Int. Cl.² .......................... B23P 11/02; B25B 27/06
[52] U.S. Cl. ........................................ 29/235; 29/252; 29/280
[58] Field of Search ................... 29/234, 235, 280, 252

[56] References Cited

U.S. PATENT DOCUMENTS

| 1,603,471 | 10/1926 | Johnson et al. | 29/280 X |
| 1,861,304 | 5/1932 | Etheridge | 29/252 |
| 3,848,318 | 11/1974 | Giuffredi | 29/252 X |

FOREIGN PATENT DOCUMENTS 553,085  5/1943  United Kingdom ...................... 29/235

Primary Examiner—James L. Jones, Jr.
Assistant Examiner—K. J. Ramsey
Attorney, Agent, or Firm—Learman & McCulloch

[57] ABSTRACT

An improved propeller shaft liner of the type employed to damp propeller shaft vibrations and apparatus for inserting such liner into the propeller shaft. A tubular liner of paper is formed with a symmetrically disposed series of axially or helically extending groove-like indentations which provide the formed liner tube with a resiliently resisted radial and circumferential compressibility characteristic. This compressibility enables the liner to be inserted into a propeller shaft having an internal diameter less than the outer diameter of the liner, with the liner being symmetrically deformed to engage the shaft in an accurately centered position to achieve a proper rotary balance of the shaft. Apparatus for inserting the tube into a shaft is also disclosed.

2 Claims, 6 Drawing Figures

PROPELLER SHAFT LINER AND INSERTING APPARATUS

This is a division, of application Ser. No. 544,236, filed in the U.S. Pat. Office on Jan. 27, 1975, now U.S. Pat. No. 4,014,184.

BACKGROUND OF THE INVENTION

The present invention is directed to propeller shaft liners of the type disclosed in Rowland et al U.S. Pat. No. 2,751,765. Liners of this type are customarily manufactured by convolutely winding an outer layer or ply of corrugated paper upon a wound paper tube with the outer or envelope diameter of the corrugated outer layer slightly exceeding the internal diameter of the hollow propeller shaft into which the liner is to be inserted. When the tube is inserted into the shaft, the corrugations of the outer layer are compressed against the inner wall of the shaft and are thus capable of absorbing and damping propeller shaft vibrations.

The wrapping or winding of the final layer of corrugated paper on the exterior of the liner tube requires specialized equipment for handling the corrugated strips during the winding operation, and the relatively fragile corrugations exposed on the exterior of the tube require some care in handling operations prior to and during the insertion of the liner into the shaft. Optimum vibration damping characteristics will be achieved when the liner is in firm, uniform centered engagement with the tube over the entire external surface of the liner.

The present invention is especially directed toward the construction of a propeller shaft liner which does not employ an outer layer of corrugated material, but instead employs a smooth paper tube having a relatively small number of relatively deep axially or helically extending indentations in its outer surface, the indentations being of such a depth as to form corresponding ribs in the interior surface of the liner.

SUMMARY OF THE INVENTION

In accordance with the present invention, a propeller shaft liner is formed from a paper tube by impressing or rolling a number of axially or helically extending indentations or grooves in the tube wall. The grooves or indentations effectively divide the tube circumference into a plurality of individual segments interconnected by cusp-like ribs which resiliently resist circumferential compression of the tube. By employing a relatively small number of such indentations, preferably at least three, a relatively large surface area of contact can be achieved between the external surface of the liner and the inner wall of the propeller shaft to increase the vibration absorption characteristic of the inserted liner. In the prior art construction employing a corrugated outer ply on the liner, the relatively large number of "grooves" in the corrugated material presented a substantial limit to the area of contact between shaft and liner.

The indentations or grooves employed in the present invention are relatively deep and deform the liner wall to the extent that radially inwardly projecting ribs are formed on the inner side of the liner which are of a cusp-like configuration when the liner is viewed in transverse cross-section. The side walls of the ribs thus formed are inclined relative to each other and by flexing and compression resiliently resist circumferential movement of the circumferential segments between the ribs toward each other as the liner is circumferentially compressed during insertion into the propeller shaft, whose internal diameter is slightly less than the normal or uncompressed diameter of the liner.

To facilitate insertion of a liner into a propeller shaft, an inserting apparatus is provided which includes a sizing ring having an internal annular shoulder dimensioned to seat upon one end of a propeller shaft. A tapered bore in the sizing ring progressively compresses the circumference of the liner as it is advanced through the sizing ring to a diameter slightly less than that of the internal diameter of the bore while maintaining the advancing liner in coaxial alignment with the bore. The opposite end of the liner is seated in a pusher block which in turn is seated in a guide block, the two blocks, when seated, cooperatively defining an annular groove which receives one end of the tubular liner. The pusher block and guide block are respectively mounted on each of a pair of two telescopic piston rods which in turn are driven in axial reciprocation by a two-stage fluid pressure actuated motor. During the major portion of insertion of a tube into a shaft, the two blocks move together. As the conclusion of the insertion approaches, the guide block engages the sizing ring and is held stationary while the pusher block continues to advance through the sizing ring to push the final end of the liner into the propeller shaft to a predetermined position.

Other objects and features of the invention will become apparent by reference to the following specification and to the drawings.

IN THE DRAWINGS

Figure 1:
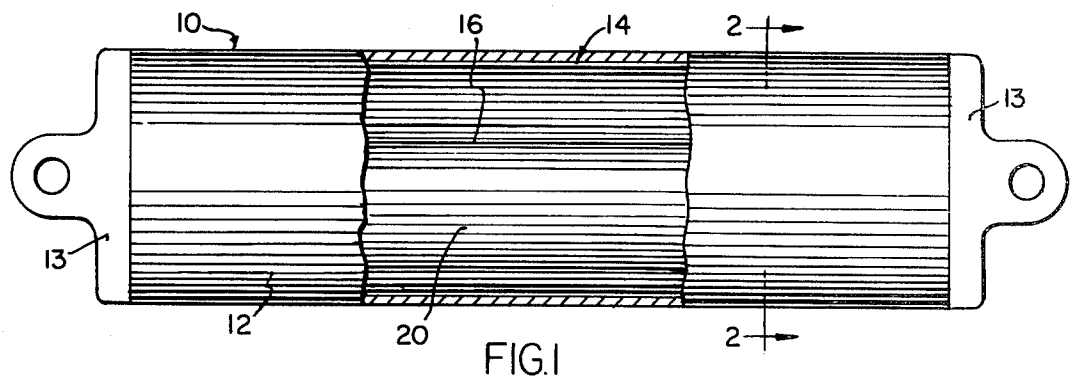
FIG. 1 is a side elevational view, with certain parts broken away, showing a propeller shaft assembly having a liner in accordance with the present invention.

Referring first to FIG. 1, there is shown a propeller shaft assembly designated generally 10 which may be assumed to be of conventional construction and which includes a hollow, cylindrical shaft 12 having a pair of coupling caps 13 fixedly secured or welded to its opposite ends. A propeller shaft liner designated generally 14 is located within the interior of shaft 12 in a press fit relationship, the axial length of liner 14 being substantially equal to the axial length of the tubular shaft 12. The liner, although stiff, is resiliently flexible to permit limited radial compression and expansion thereof.

Figure 2:
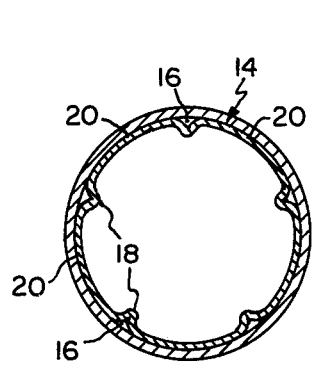
FIG. 2 is a transverse cross-sectional view taken on the line 2—2 of FIG. 1.

As best seen in the cross-sectional view of FIG. 2, a liner 14 embodying the present invention comprises a hollow tube of wound paperboard or other fibrous material and having a plurality of longitudinally extending, concavo-convex indentations or inward deformations 16 of the liner wall which produce radially inwardly projecting cusp-like ribs 18 in the interior of the tubular liner. The indentations 16 effectively divide the tube circumference, as viewed in FIG. 2, into a plurality of circumferential segments 20 which are symmetrically spaced about the axis of the tubular liner 14.

Figure 3:
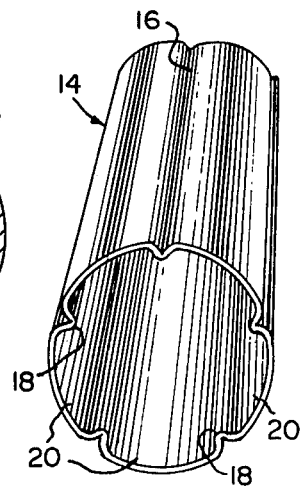
FIG. 3 is a perspective view of an end portion of one form of liner embodying the present invention.
Figure 4:
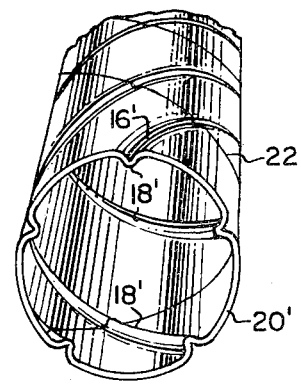
FIG. 4 is a view similar to FIG. 3 showing another form of liner.

Referring to FIGS. 3 and 4, the indentations 16 and the corresponding internal rib 18 may extend axially of the tube as shown in FIG. 3 or may extend helically of the tube as at 16' in FIG. 4. In either event, a cross-sectional view of a propeller shaft having a liner in the form of FIG. 3 or in the form of FIG. 4 will present a cross-sectional configuration as shown in FIG. 2.

Liners according to the present invention are frequently constructed from a multi-ply paper tube in which the various plies are laid up in the form of spirally wound strips. In the case where such a tube is employed for the liner of the kind shown in FIG. 4, the helical grooves or indentations 16' are preferably formed with a pitch opposite to that of the wound paper strips, the boundary between adjacent turns of the wound paper material being indicated at 22 in FIG. 4.

The grooves or indentations 16 or 16' of the liners of FIGS. 3 and 4 may be formed by passing the tube axially through an appropriately conformed set of die rollers. In the formation of the indentations 16, the wall of the originally cylindrical paper tube is deformed through its entire thickness to produce internally projecting ribs 18 in correspondence with the grooves or deformations 16 on the outer surface of the tube. The normal or relaxed outside diameter of the formed tube as shown in FIGS. 3 and 4 is selected to be somewhat greater than the internal diameter of the hollow shaft 12 into which the liner subsequently is to be inserted.

As is shown in FIGS. 3 and 4, subsequent to the formation of the liner and prior to its insertion into the shaft 12, the liner, as viewed in cross-section, is made up of a group of symmetrically disposed outwardly bowed circumferential segments 20 integrally connected to each other by inwardly projecting ribs 18 of a generally V-shaped cross-section. As the overall outside diameter of the tubular liner is reduced, as by applying a radially inwardly directed pressure uniformly around its entire circumference, the corresponding reduction in circumference of the liner requires the individual circumferential segments 20 to move toward each other by squeezing the open ends of the V-shaped ribs 18 toward each other. This action is resisted by the ribs, which develop a reactive force opposing the approaching movement of adjacent circumferential segments 20 and this force in turn tends to bow the individual segments 20 radially outwardly. The reduction in diameter is thus resiliently resisted by the liner conformation to produce a radially outwardly directed force urging the circumferential segments 20 firmly into engagement with the interior surface of tube 12.

The symmetrical configuration of the grooves circumferentially about the central axis provides a uniform and symmetrically applied force of engagement of the liner with its shaft and the area of engagement occurs over substantially the entire extent of circumferential segments 20, the area of contact being reduced only in the regions closely adjacent the centerline of the various grooves and the width of the groove openings, as developed above, is progressively reduced as the outer diameter of the liner is reduced.

To obtain optimum damping against hoop-type or circumferential vibration, the number of indentations is preferably selected as an odd number with a preferred minimum number of grooves 16 being three.

Figure 5:
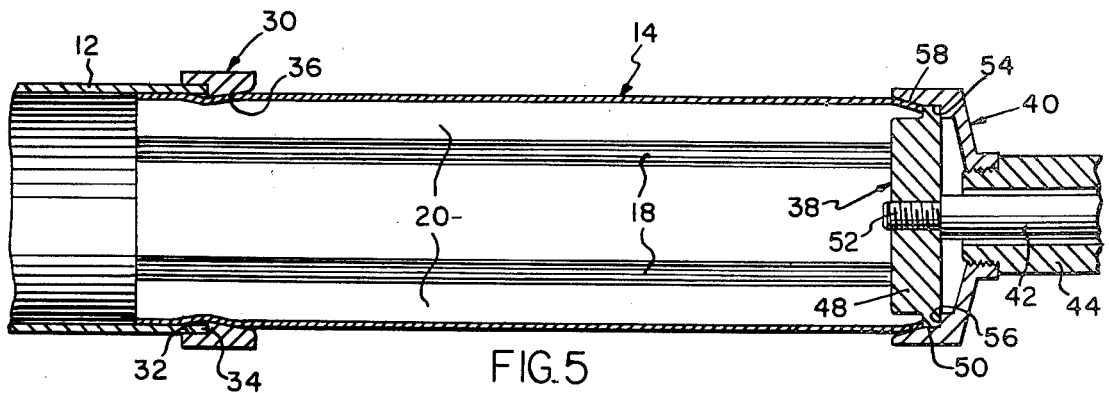
FIG. 5 is a detailed cross-sectional view, taken on a central axial plane showing a portion of the apparatus for inserting a liner into a shaft.
Figure 6:
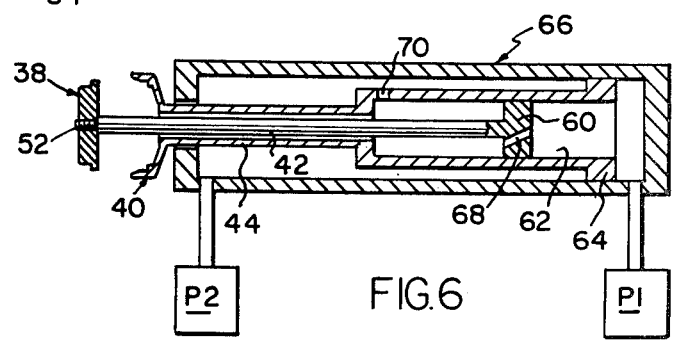
FIG. 6 is a detailed cross-sectional view of the fluid pressure motor employed with the apparatus of FIG. 5.

In FIGS. 5 and 6, an apparatus for inserting liners such as those described above into hollow tubular shafts 12 is disclosed. Such apparatus includes an annular sizing ring designated generally 30 which is counterbored at one end as at 32 to form a radial shoulder 34 which is adapted to be seated upon the end of a tube 12 as shown in FIG. 5. A bore 36 tapers inwardly from the opposite axial end of sizing ring 30, bore 36 tapering from a maximum diameter at its outer end which is slightly greater than the normal or relaxed outer diameter of a liner 14 to a minimum diameter at its inner end which is equal to or slightly less than the internal diameter of the tube 12 into which liner 14 is to be inserted. As liner 14 is advanced axially through ring 30 from right to left as viewed in FIG. 5, the outer diameter of liner 14 is progressively compressed to a diameter such that it can be fed into the interior of tube 12 without interference.

To supply the force necessary to advance liner 14 through sizing ring 30 into shaft 12, a cooperating pusher member designated generally 38 and guide block 40 are coupled through respective telescopic piston rods 42 and 44 to a two-stage fluid pressure cylinder 46 (FIG. 6).

Pusher block 38 is disc-like in configuration and is formed with a main body portion 48 of a diameter less than the internal diameter of liner 14 and a radially projecting flange 50 dimensioned to seat upon the end of liner 14, but having a diameter slightly less than the minimum internal diameter of sizing ring 30 and the internal diameter of shaft 12 so that the pusher member can be advanced through the sizing ring and into the interior of tube 12. Pusher member 38 is fixedly secured to the end of its piston rod 42 as by a threaded connection 52.

Guide block 40 is counterbored as at 54 to form a radially inwardly projecting shoulder 56 which, with bore 54, provides a seat for receiving flange 50 of pusher block 38. A tapered bore 58 flaring outwardly from counterbore 54 tapers from a maximum diameter slightly greater than the outer diameter of liner 14 to a minimum diameter just slightly greater than the diameter of flange 50. As best seen in FIG. 5, when pusher member 38 is seated in guide block 40, tapered bore 58 in guide block 40 and the peripheral surface of main body portion 48 of the pusher member 38 define an annular groove which receives the end of liner 14, the tapered wall of bore 58 slightly compressing or crimping the outer diameter of liner 14. Pusher block 40 is threadedly secured to the end of its piston rod 44.

Piston rod 42 is telescopically received within piston rod 44, as is shown in FIG. 6. A piston head 60 fixedly secured to piston rod 42 is slidably received within a chamber 62 formed in a piston head 64 integrally connected to piston rod 44. Piston head 64 in turn is slidably received within cylinder 66 and suitable pressure fluid sources P1 and P2 are respectively connected to the head and rod end of cylinder 66. Fluid pressure supplied from source P1 is applied to the right-hand end (as viewed in FIG. 6) of piston 64 and is balanced across piston head 60 by passage 68 through piston head 60. Fluid pressure source P2 supplies a relatively low counter pressure which normally functions to maintain piston 60 at its right-hand end limit of travel relative to piston 64, in which pusher member 38 is seated in guide block 40 as shown in FIG. 5. Pressure from source P2 is applied against the left-hand side of piston head 64 directly and communicates with the left-hand side of piston head 60 via a restricted passage 70.

The pusher assembly as shown in FIG. 6 is located in coaxial alignment with the hollow shaft 12 into which the tube is to be inserted at the commencement of the inserting operation.

To insert a liner 14 into tube 12, both pistons 64 and 60 are located at their extreme right-hand end limits of movement with pusher member 38 seated in block 40. Pressure sources P1 and P2 are provided with appropriate valving of conventional arrangement to enable appropriate actuation of the pistons. Location of the pistons at their extreme right-hand end limit of movement is accomplished by venting the head end of cylinder 66 while applying pressure from source P2. A liner 14 to be inserted is then located with one end seated upon pusher member 38 and guide block 40 as shown in FIG. 5 and with its opposite end spaced slightly outwardly from and in coaxial alignment with a sizing ring 30 seated upon a propeller shaft 12. The rod end of cylinder 66 is then vented and pressure from source P1 drives both pistons to the left as viewed in FIG. 6 to drive the liner 14 through sizing ring 30 into the interior of shaft 12, the frictional resistance between the sizing ring and liner maintaining piston 60 at its right-hand end limit of travel during this stroke.

When liner 14 has been pushed into shaft 12 to the point where guide block 40 engages sizing ring 30, guide block 40 halts, but pusher member 38 continues to move forwardly, pushing liner 14 before it. Pusher member 38 advances through sizing ring 30 and into the interior of shaft 12 to a distance predetermined by the stroke of piston 60. Pistons 60 and 64 are then returned to their original position.

While various embodiments of the invention have been described, it will be apparent to those skilled in the art that the disclosed embodiments may be modified. Therefore, the foregoing description is to be considered exemplary rather than limiting and the true scope of the invention is that defined in the following claims.

I claim:

1. Apparatus for inserting a radially resiliently compressible tubular liner into a hollow cylindrical shaft having an inside diameter less than the normal uncompressed outer diameter of the tubular liner, said apparatus comprising a sizing ring having a tubular liner-passing opening therethrough tapering from a minimum diameter equal to or less than the inside diameter of said shaft to a maximum diameter equal to or greater than said normal outer diameter of said tubular liner, means for seating said ring on one end of said shaft, pusher means including a disc-like pusher member axially engageable with one end of said tubular liner and having an outer diameter less than said minimum diameter of said ring and less than the normal inner diameter of said liner, an annular guide member having an opening in one end thereof adapted to receive said pusher member in axially seated engagement within said opening, annular surfaces on said guide member and said pusher member cooperable when said pusher member is seated within said opening to define an annular groove adapted to receive one end of said tubular liner, the radially outer wall of said groove tapering from a maximum diameter at the mouth of the groove which is slightly greater than the normal outer diameter of said liner to a minimum diameter approximately equal to the outer diameter of said pusher whereby said one end of said liner is radially compressed when received in said groove.

2. Apparatus as defined in claim 1 further comprising power means including a two-stage fluid pressure operated motor having a pair of telescopic piston rods, one of said rods being coupled to said pusher member and the other of said rods being coupled to said guide member and operable upon engagement between said guide member and said sizing ring for driving said pusher member axially out of seated engagement with said guide member, through said sizing ring and into the interior of said shaft.

* * * * *